May 30, 1950 J. B. CLAPP 2,509,422
AERIAL CABLE MESSENGER RING
Filed Jan. 5, 1946

INVENTOR.
JEROME B. CLAPP
BY
Warren S. Ortow
ATTORNEY

Patented May 30, 1950

2,509,422

UNITED STATES PATENT OFFICE 2,509,422

AERIAL CABLE MESSENGER RING

Jerome B. Clapp, North Plainfield, N. J., assignor to The Thomas & Betts Co., Elizabeth, N. J., a corporation of New Jersey Application January 5, 1946, Serial No. 639,453

9 Claims. (Cl. 248—61)

The invention relates to a suspension, or messenger ring or hanger for supporting an aerial cable or a group of aerial cables underhung from an overhead messenger strand which as usual is strung under tension between spaced apart supports, such as street poles.

The usual practice is to provide metal straps or rings of different kinds looped about the cables and messenger, but such devices possess several objectional features. For instance, these rings tend to chaff the insulation when underlapping insulated cables and wear away the covering of lead sheet cables by reason of the friction developed therebetween incidental to the swinging or vibration of the messenger or cables or both, known as "ring burns."

Accordingly, among the objects of the invention are to provide a simplified form of messenger suspension which will keep down ring burns; to provide a form of suspension which can be used on cables other than lead covered cables and at the same time to provide for a better distribution of the load imposed thereon by the weight of the cables than is provided by known forms of messenger rings.

Broadly, the invention features a form of suspension which is of wide open, spiral one-piece design arranged to provide widely spaced supports for overlapping and thus engaging the messenger and for underlapping and thus to be engaged by the cables. The suspension is formed from insulating material and fashioned to provide integral fastening or clamping clips for securing the suspension in place on the messenger without necessity of providing separate fastening means for this purpose.

Various other objects and advantages of the invention will be in part obvious from an inspection of the accompanying drawings and in part will be more fully set forth in the following particular description of one form of device embodying the invention, and the invention also consists in certain new and novel features of construction and combination of parts hereinafter set forth and claimed.

Figure 1:
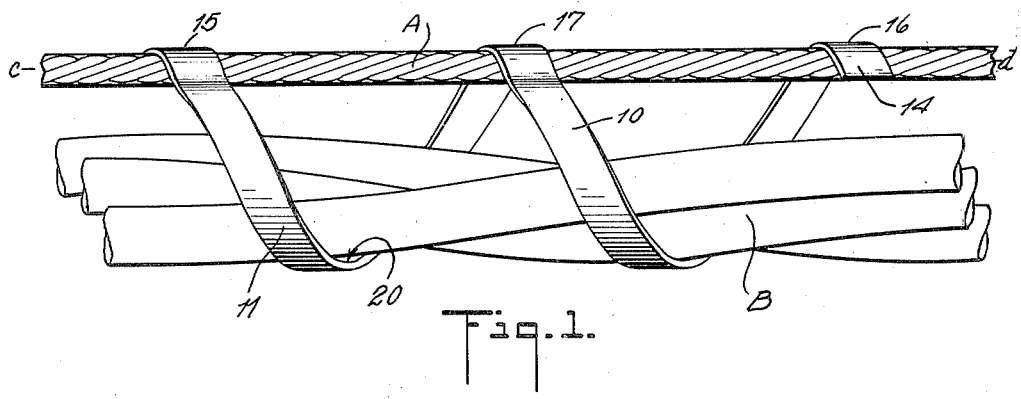
Figure 1 is a view in side elevation of a group of cables suspended from a messenger by a suspension forming a preferred embodiment of the invention.

In the drawings there is shown an overhead messenger or supporting strand A which is usually formed as a strand of steel or copperweld cable suspended more or less rigidly between supports, such as two street poles, and which is designed to support therebelow one or more cables B at a plurality of spaced apart points. In the drawings, three of such cables are shown, but as noted in Figure 4 space is left for the addition of other cables as such additional cables become necessary.

The present disclosure relates to a suspension device 10, sometimes hereinafter referred to as a non-metallic aerial duct or messenger ring for suspending the cables at such spaced apart points. The device 10 is a single, one-piece strip 11 of relatively wide and thin material of high dielectric strength coiled in the process of forming it into the wide open spiral form shown in Figure 3. In the illustrated instance, the coil so formed is sligthtly greater than two complete major turns and is marked as a compete left turn 12 and a complete right turn 13 in each case considered as starting and ending at the top of the device. These major turns are centered relative to a main or central axis of turn $a$—$b$ and as noted in Figure 4 are almost complete circles when viewed in end elevation. Each circle as viewed in Figure 4 is of relatively large diameter and of a size to accommodate a relatively large number of the aerial conducting cables B.

Figure 2:
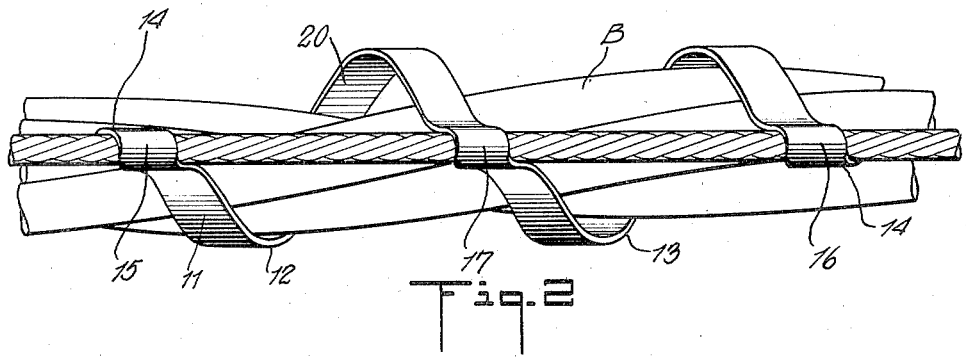
Figure 2 is a plan view looking down on the assembly shown in Figure 1.

Each end of the strip 11 is bent back circumferentially on itself on a curve of relatively small radius to form broad-faced resilient clamping clips for engaging the messenger, and terminate in lips 14. The left end as viewed from the left end of Figures 1 and 2 is shown bent counterclockwise to form a left end clip 15 and the right end is bent clockwise to form a right end clip 16. These clips are turned about a secondary axis of turn $c$—$d$ parallel to and upwardly offset from the main axis $a$—$b$ and which axis $c$—$d$ coincides with the axis of the messenger A when the device is in position thereon, as shown in Figures 1, 2 and 4.

At the point where the two turns 12 and 13 merge at the top center of the device as shown in the several figures, the strip is deformed or looped outwardly and then bent back upon itself to form a kink 17 of inverted U-shape to form an intermediate clip and dimensioned like the clips 15 and 16 to fit over the messenger with a snap action. For this purpose the kink 17 and to a lesser extent the clips 15 and 16 each form a circular bend with their slides constricted to form a narrow waist portion 18 forming a throat or opening 19 of slightly less cross section than the diameter of the messenger which it engages as best shown in Figure 4.

Figure 3:
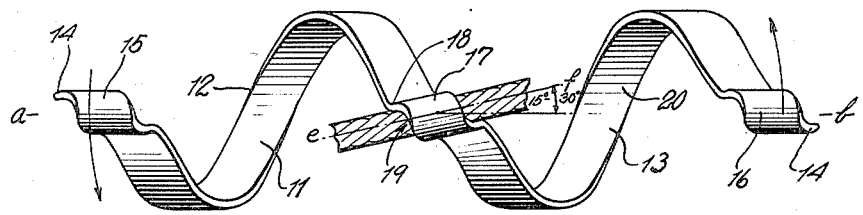
Figure 3 is a view of the suspension shown in the preceding figures in its normal preformed configuration before it is sprung into place onto the messenger.
Figure 4:
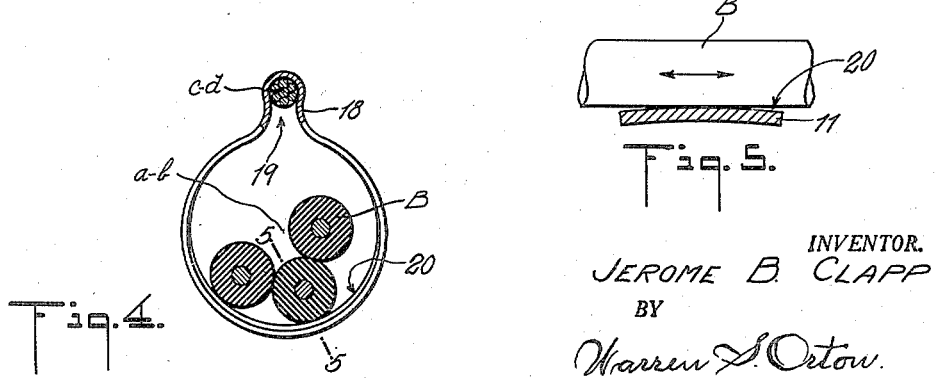
Figure 4 is a view in left end elevation of the assembly of messenger, cables and suspension shown in Figures 1 and 2.

It is particularly noted in the showing of the suspension when in its initial form, as shown in Figure 3, that the end clips 15 and 16 extend parallel to each other and concentric relative to the longitudinal axial designated by the line c—d, but the kink 17 extends at an angle of about 15-30° to this line c—d when the suspension is in its normal preformed condition and free of any distortion imposed thereon by being engaged to the messenger. It is understood that the suspension considered as a whole is to be distorted under tension when installed on the messenger as hereinafter described to obtain snubbing action and to prevent ring sliding along messenger.

Figure 5:
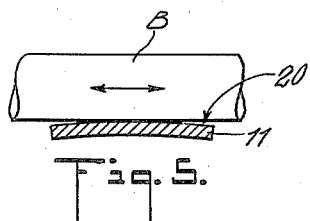
Figure 5 is a detail in section of the bottom of one of the turns of the suspension showing the rounded inner face across which the cables may slide, and showing a section taken on the line 5—5 of Figure 4.

Preferably the strip is formed with its inner face 20, or at least the cable supporting bottom faces of the turns, slightly convex and smooth as shown in Figure 5 so that any cable such as the cable B which may rest thereon, is in no way fastened to the suspension but are free to slide longitudinally over the curved rounded surfaces of the suspensions, and in this way chafing of the conductors or cables is avoided as the cables and messengers vibrate relative to each other.

The strip is moulded to shape from some suitable form of material having high dielectric strength and in the illustration is made from a canvas laminated phenolic sheet, one form of which is known commercially as formica. The strips are heat molded to the configuration shown in Figure 3 in a suitable die mold. Formica has been found to be particularly acceptable in forming the suspension because it is springy, is not affected by weather or aging, and does not become deformed by the weight of the cables supported therefrom. It is a characteristic of the suspension when so formed of such thermoplastic material that it possesses sufficient rigidity to maintain its form and at the same time possesses sufficient elasticity particularly in the clips and kink regions to grip the messenger resiliently when mounted thereon as herein featured.

The device as shown in Figure 3 is carried in stock preferably in a few standard sizes and wherever it is desired to suspend one or more cables from a messenger that size suspension device is selected from stock which will be larger than is necessary to accommodate the number and sizes of cables intended at the time to be suspended. The device illustrated was drawn from a suspension in which the internal diameter of turns 12 and 13 was about five inches. It is also suggested that two different size suspensions be used on the same messenger with the larger sizes alternating with the smaller sizes to thus provide two aeroducts. This practice of using an over-size suspension is suggested so that, in the event it is necessary from time to time to add another cable, such additional cable or cables may be threaded through the line of suspensions already in place, thus economizing in installation cost over the present practice of dismantling messenger rings whenever an additional cable is to be strung. It is understood that the suspension device is mounted in place without disturbing either the messenger or the cables from their prefixed positions suspended between the street poles.

In mounting the device in place, the center is hooked about the messenger and, with the opposite ends hanging loose, the kink 17 is then forced down over the messenger and at which time the device, considered as a whole, is extending at an angle of about 15°–30° to the length of the messenger, whose axis is indicated by the line e—f in Figure 3. The messenger enters the throat opening 19, forces the sides of the waist portion 18 apart and the kink is thus snapped into position engaging the messenger as shown at the top of Figure 4. The operator then grasps one of the ends, either end, which at this time is offset laterally from the messenger and forces the same towards the messenger as shown by one of the long arrows in Figure 3. The associated clip as it is located over the messenger is then forced downwardly into clutching engagement with the messenger. At this point the suspension has the end portion so shifted slightly relative to the central portion of the suspension to bring the clip 17 and the end clip so operated upon into alignment on the messenger. The operator then grasps the other offset end and likewise forces its clip first inwardly into parallel relation to the messenger and slightly above the same and then forces it downwardly into clamping engagement with the messenger as indicated for the first clip. In effect then, the kink 17 remains fixed relative to the messenger and the two turns 12 and 13 on opposite sides thereof are distorted slightly out of their initial configuration to bring their clip-forming ends into alignment with the axis e—f of the kink. This has the effect of snubbing the grip on to the messenger with the two clips tending to move in the direction opposite to that indicated by the long arrows and thus tending to restore the device to its initial configuration shown in Figure 3. At the end of these operations, the device is in the position illustrated in Figures 1 and 2 with the device firmly clamped to the messenger at three spaced-apart points 15, 17 and 16 and with the cables suspended at the two widely spaced-apart points formed by the loose loops of the two turns 12 and 13 with the cables, incidentally finding their seated positions on the portions of the two cable turns, or one on the other or others, as suggested in the showing in Figure 4. The suspension considered as a whole is simply twisted out of its initial shape so as to build up a residual strain in the two loops or turns 12 and 13 thus aiding in the locking of the suspension to the messenger A.

When it is desired to remove the suspension, it is necessary simply to engage the finger pieces provided by the lips 14 and forcefully lift the associated clip off the messenger, lifting first one clip and then the other, and the suspension will automatically restore itself by reason of its inherent elasticity into position with the kink 19 still in place on the messenger and with the suspension angularly disposed relative to the length of the messenger.

By means of a device of the character described, it is possible to mount the suspension quickly and positively onto any selected position along the length of the messenger, and the device is secured in place without necessity of using any special tools or separate fastening means for mounting or for securing it in place. As the suspension is made of insulating material, it may be utilized in connection with an unleaded cable or cables, and the possibility of short circuiting the conductor or cables through their suspension is thus avoided.

As it is possible to use non-leaded cable with the insulating suspension herein featured, the usual lead sheath can be eliminated, and thus there results a saving both in the cost of the cables used as well as in the installation. The wide ribbon-like material used in forming the suspension provides relatively extensive areas of contact, which thus has a tendency to keep down ring burns even if the suspension were made of metal instead of the insulating material herein featured.

The suspension herein featured provides three points of suspension on the messenger and two points of support for the cable with the cable supports located in the open spaces formed between and below the points of suspension, thus providing for a better distribution of the load than is provided by known devices.

I claim:

1. In a device of the class described, the combination with an overhead messenger and a plurality of aerial conducting cables grouped together beneath the messenger, of a non-metallic support for suspending the group of cables from the messenger, said suspending support including a single one-piece strip of material having high dielectric strength, of open spiral form and including at least two turns spaced apart a distance greater than diameter of the spiral and of sufficient rigidity to maintain its form when unloaded, the opposite ends of the strip being each bent back upon itself in a curve of small radius, one bent clockwise and the other bent counter-clockwise to form a pair of clips for hooking over the messenger in opposite directions and for clampingly engaging the messenger, said coiled strip including at the upper portion of one of its turns an inverted U-shaped kink forming an intermediate clip for overlapping and embracing the messenger between the points engaged by the end clips and said turns providing a lower opening which considered axially is of relative large radius and adapted to accommodate the group of cables in position therein resting loosely on the lower portion thereof, with the cables suspended between adjacent turns, unattached thereto and thus capable of movement relative to each other, to the messenger and to said suspending support substantially without resistance from the support.

2. A suspension for hanging cables from a messenger, said suspension formed from a wide, thin strip of insulating material for the most part wound into a wide open spiral form concentric relative to a main longitudinal axis, opposite ends of the strip being offset from the spiral and each bent back upon itself to form a clip of inverted U-shape form for overlapping and clampingly engaging the messenger, both clips being concentric relative to an axis parallel to and offset from the main longitudinal axis of the spiral and projecting outwardly from the suspension on one side thereof, and an intermediate portion of the suspension and on said side of the suspension being outwardly looped to form a kink of inverted U-shape with its axis extending at an angle to the first named axis, said suspension being sufficiently rigid to maintain its configuration when free of distorting strains and sufficiently flexible to be distorted by manual pressure into shape to bring the axes of the clips into registry with the axis of the kink.

3. A device for suspending one or more cables from a messenger and for minimizing chaffing and the formation of ring burns on the cable by reason of the swinging or vibration of the device and the cable suspended thereby, comprising a ribbon-like strip of wide and relatively thin plastic insulating material of high dielectric strength, pre-wound into an open spiral form, having sufficient rigidity normally to maintain such form and having sufficient elasticity to return to such form when deforming forces thereon are removed, said spiral strip forming for the most part at least two turns each substantially circular in cross section, coaxially related and coacting to define the lower side of a common cylinder of reference, and each turn extending axially for a distance materially greater than the thickness of the strip and forming on its inner face a smooth-faced seat for engaging the cable, with at least one turn along one side thereof departing in configuration from such cylinder of reference to form an outwardly extending integral strip for resiliently clamping the device to the messenger along a length of the messenger materially longer than the thickness of the plastic strip engaging the same.

4. A cable suspension of spiral form having its ends each bent back upon itself to form clips having a common axis extending longitudinally of the spiral and adapted to engage a messenger and one of the turns of the spiral intermediate such ends being looped outwardly to form a kink of inverted U-form open to the interior of the loop and also adapted to engage said messenger by snapping over the same, the axis of said kink normally extending at an angle to the first named axis and said suspension in the portions thereof on opposite sides of the kink adapted to be twisted into position to cause said axes to coincide and thus engage the messenger under tension.

5. A suspension for supporting one or more cables from a messenger, comprising a one-piece length of flat material preformed into a wide open spiral, with the turns having greater length than diameter, opposite ends of the suspension forming integral resilient clips for securing the suspension to the messenger, and the turns of said spiral providing on the inner faces of their lowermost sides with longitudinally spaced apart smooth convex seats on which the cables are supported in position free to slide through the turns without chafing and providing an extensive area of contact lengthwise of the cable as it hands with its usual catenary or drop assumed thereby between adjacent turns of the spiral support.

6. Means for suspending a cable from a messenger, comprising a length of insulating material in spiral form, said spiral provided on one side thereof with three loops formed integral therewith for overlapping the messenger, the centers of said loops being in alignment and the middle loop extending at an angle to the two end loops, and said spiral having sufficient flexibility to permit it being deformed under a distorting load out of its initial configuration to cause the three loops to be brought into alignment and in snubbing engagement with the messenger.

7. A suspension for securing one or more cables from a messenger in insulated relation thereto, comprising a single, wide, thin, ribbon-like strip of insulating material of a canvas laminated phenolic type, for the most part coiled into an open spiral of at least two turns and coacting to form a duct for receiving the cables extending loosely therethrough, the inner faces of the lower portions of the turns of the spiral forming spaced-apart smooth seats normally defining a portion of a cylinder of reference and said seats each extending lengthwise of the axis of the spiral for a material distance in spaced-apart prolongation of each other to provide at least two broad, smooth bearing surfaces for supporting the cables and for permitting the cables to slide freely thereon incidental to shifting of one suspension relative to the cables, and means for securing the suspension from the messenger.

8. An aerial cable messenger ring comprising a single strip of substantially flat ribbon-like material preformed to a spiral shape with at least two widely spread apart turns, the inner surfaces of the flat side of the turns defining a cylindrical surface, each end of the strip being bent back upon itself approximately U-shaped and offset outwardly from said cylindrical surface to form end clips disposed in alignment and adapted to snap over the messenger and said strip at its mid-length being bent back sharply upon itself into a U-shaped and also offset outwardly from said cylindrical surface to form an intermediate resilient kink adapted to snap over the messenger, to clamp the ring thereto, said kink having its axis disposed at an angle to the common axis of the end clips.

9. In a device of the class described, the combination of an overhead messenger strand string under tension between spaced apart supports in substantially horizontal position, a cable supporting suspension hung from the strand and adapted to have one or more cables hung from and supported by the same, said suspension comprising a single strip of substantially flat relatively wide and thin insulating material molded to a spiral form and slightly greater than two major turns coaxially centered relative to a main axis of turn, each end of the strip being bent back circumferentially on itself on a curve of relatively small radius to form a pair of broad-faced resilient clamping clips engaging the messenger strand concentric relative to a secondary axis of turn parallel to and offset from said main axis of turn and which axis coincides with the axis of the messenger strand, said two turns where they merge at the top center of the suspension being looped outwardly and then bent back upon itself to form a kink of inverted U-shape forming an intermediate clip fitting over the messenger strand, and said intermediate clip biased to rotate about an axis perpendicular to itself and to the messenger strand in a tendency to dispose its length at an angle to the secondary axis of turn.

JEROME B. CLAPP.

REFERENCES CITED

The following references are of record in the file of this patent:

UNITED STATES PATENTS

| Number | Name | Date |
|---|---|---|
| 941,605 | Baekeland | Nov. 30, 1909 |
| 1,151,215 | Ogden | Aug. 24, 1915 |
| 1,215,009 | Edwards | Feb. 6, 1917 |
| 2,373,328 | Morehouse | Apr. 10, 1945 |